Figure 1:
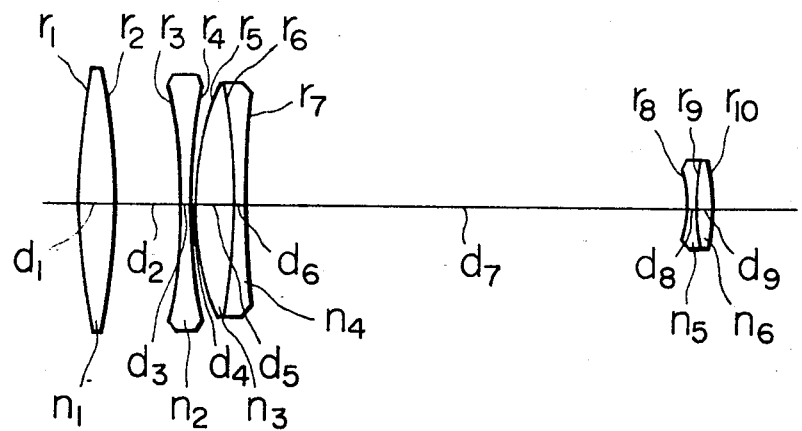

United States Patent
Itoh

3,770,341
Nov. 6, 1973

[54] TELESCOPIC LENS SYSTEM HAVING SMALL TELEPHOTO RATIO

[75] Inventor: Keiichi Itoh, Tokyo, Japan

[73] Assignee: Olympus Optical Company, Tokyo, Japan

[22] Filed: Feb. 22, 1972

[21] Appl. No.: 227,971

[30] Foreign Application Priority Data
Feb. 23, 1971 Japan.................................. 46/8373

[52] U.S. Cl.................... 350/220, 350/176, 350/177
[51] Int. Cl......................... G02b 9/34, G02b 13/02
[58] Field of Search.................... 350/220, 176, 177

[56] References Cited
UNITED STATES PATENTS
| | | | |
|---|---|---|---|
| 2,458,836 | 1/1949 | Cox............................. | 350/220 |
| 3,502,394 | 3/1970 | Kobayashi..................... | 350/216 |
| 3,467,462 | 9/1969 | Kazamaki et al. ............... | 350/216 X |
| 2,576,436 | 11/1951 | Baker........................... | 350/216 X |

Primary Examiner—John K. Corbin
Attorney—Eric H. Waters et al.

[57] ABSTRACT

A telescopic lens system having front and rear groups of lenses spaced apart one from the other by a large air space. The front group of lenses consists of a first biconvex lens, a second biconcave lens spaced apart from the first biconvex lens, a third biconvex lens spaced apart from the second biconcave lens by a small air space and a fourth biconcave lens, the third and fourth lenses being in contact or spaced apart by a small air space. The whole lens system is designed to satisfy the following five conditions 1. $f_{234} \leq -f$,
2. $-2f \leq r_3 \leq -0.4f$,
3. $0.03f \leq d_2 \leq 0.1f$,
4. $|n_3 - n_4| \leq 0.03$ and $\theta_4 - \theta_3/\nu_3 - \nu_4 \leq 0.0015$, and
5. $n_1 \leq 1.55$ and $\nu_1 \geq 60$ where $f_{234}$ ... the composite focal length of the second, third and fourth lenses, $f$ ... the composite focal length of the whole lens system, $r_i, d_i, n_i, \theta_i$ and $\nu_i$ ($i=1,2,3,...$) ... the radius of curvature of the $i$th lens, thickness of the $i$th lens or air spaced between the $i$th and ($i+1$)th lenses, refractive index, partial dispersion ratio ($ng-nF/nF-nc$) where $ng$ ... refractive index for $g$-line
$nF$ ... refractive index for $F$-line and
$nc$ ... refractive index for $C$-line, and
Abbe's number of the $i$th lens, respectively.

3 Claims, 7 Drawing Figures

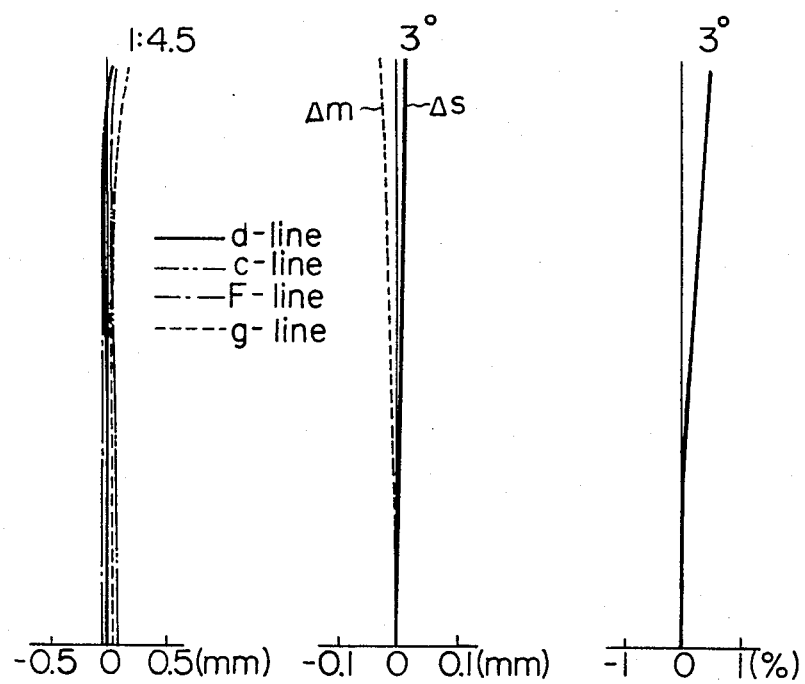

TELESCOPIC LENS SYSTEM HAVING SMALL TELEPHOTO RATIO

This invention relates to a telescopic lens system for use in cameras and having a small telephoto ratio on the order of at most 0.8.

In the telescopic lens system comprising a front group of lenses and a rear group of lenses separated from the front group of lenses by a large air space, it is desirable to make the telephoto ratio $K$ ($K = (\Sigma d_i + f_B)/f$) where $\Sigma d_i = d_1 + d_2 + d_3 \ldots$ and $f_B$ is back focus and $f$ is the composite focal length of the whole lens system) as small as possible for ease of handling the telescopic lens system. However, in order to decrease the telephoto ratio it is necessary for the refractive power of the convex lens belonging to the front group of lenses to be made a large positive value and for the refractive power of the concave lens belonging to the rear group of lenses to be made a large negative value.

As a result of this, there occurs non-uniformity in the distribution of the refractive power between the front and rear groups of lenses, thereby making the correction of various aberrations considerably difficult. Thus, the conventional telescopic lens system often has a telephoto ratio $K$ on the order of from 0.85 to 0.9.

In the conventional telescopic lens surface system having a telephoto ratio on the order of from 0.85 to 0.9, if the focal length is made longer, the aberrations become correspondingly larger, with the result that the image is considerably degraded.

An object of the invention, by adopting suitable refractive power distribution and suitable glass substance, is to provide a telescopic lens system having a small telephoto ratio on the order of at most 0.8 with various aberrations significantly corrected.

This and other desirable objects are attained, according to this invention, by a telescopic lens system comprising a front group of lenses and a rear group of lenses separated from the front group of lenses by a large air space, the front group of lenses consisting of a first biconvex lens, a second biconcave lens spaced apart from the first biconvex lens, a third biconvex lens spaced apart from the second biconcave lens by a small air space and a fourth biconcave lens, the third and fourth lenses being in contact or spaced apart by a small air space, the whole lens system being designed such that the five conditions are satisfied 1. $f_{234} \leq -f$,
2. $-2f \leq r_3 \leq -0.4f$,
3. $0.03f \leq d_2 \leq 0.1f$,
4. $|n_3 - n_4| \leq 0.03$ and $(\theta_4 - \theta_3/\nu_3 - \nu_4) \leq 0.0015$, and
5. $n_1 \leq 1.55$ and $\nu_1 \geq 60$ The reasons why the condition 1 that $f_{234} \leq -f$ must be satisfied are due to the fact that the smaller the telephoto ratio to be used the stronger must be the refractive power of the convex lenses belonging to the front group of lenses be made, and that with a too strong refractive power the various aberrations become unbalanced. The provision of the front group of lenses having a weak negative refractive power shown by the condition $f_{234} \leq -f$ in accordance with the invention results in that the various aberrations are significantly corrected.

On the contrary, if $f_{234} > -f$ the negative refractive power of the front group of lenses becomes strong and hence it is impossible to make the telephoto ratio small. The forced decrease of the telephoto ratio causes increased positive refractive power of the first lens whereby the spherical aberration becomes degraded and thus results in a restriction in the resolution at the center of the lenses and in an overcorrection of the Petzval sum and it becomes difficult to correct the astigmatism.

The reasons why the condition 2 that $-2f \leq r_3 \leq -0.4f$ must be satisfied are due to the fact that the condition 2 prevents a degradation of the balance of the coma which results from the difference in wave lengths of the rays.

That is, the luminous flux passing below the optical axis and emitted from the rear face of the first lens whose radius of curvature is $r_2$ (FIG. 1) is inclined by a relatively large angle from the optical axis. If $r_3 > -0.4f$ the coma of the luminous flux passing below the optical axis causes a large overcorrection with respect to the rays whose wave length is shorter than the wave length of the standard ray ($d$-line) and causes an undercorrection with respect to the rays whose wave length is longer than the wave length of the standard ray ($d$-line). If $r_3 < -2f$, it is possible to correct the coma with respect to the rays whose wave length is shorter than the wave length of the standard ray while there occurs an undercorrection of the coma with respect to the rays whose wave length is longer than the wave length of the standard ray, thereby rendering the coma unbalance.

The reasons why the condition 3 that $0.03f \leq d_2 \leq 0.1f$ must be satisfied are due to the fact that the condition 3 together with the condition 2 serves to correct the chromatic aberration with respect to various wave lengths, Petzval sum and coma of the luminous flux passing below the optical axis.

Contrary to the condition 3, if $d_2 > 0.1f$, the Petzval sum becomes large while the zonal spherical aberration with respect to the rays having wave lengths shorter than the standard ray becomes small, but the coma with respect to the standard ray passing below the optical axis is degraded.

If $d_2 < 0.03f$, then the Petzval sum becomes a large negative value and hence it is impossible to correct astigmatism.

The reasons why the condition 4 that $|n_3 - n_4| \leq 0.03$ and $(\theta_4 - \theta_3/\nu_3 - \nu_4) \leq 0.0015$ must be satisfied are due to the fact that such condition 4 serves to decrease the secondary spectrum of the chromatic aberration which tends to considerably degrade the resolution at the center of the telescopic lens system.

That is, the use of a third biconvex lens made of glass having a large partial dispersion ratio and a fourth biconcave lens made of glass having a small dispersion ratio in accordance with the condition 4 is capable of decreasing the difference between the refractive indexes of these lenses and hence of preventing the overcorrection with respect to the rays having short wave lengths.

The reasons why the condition 5 that $n_1 \leq 1.55$ and $\nu_1 \geq 60$ must be satisfied are due to the fact that the use of a first biconvex lens having a strong positive refractive power and made of glass having a small refractive index and small dispersion ratio in accordance with the condition 5 is capable of increasing the Petzval sum and preventing the increased chromatic aberration at the front group of lenses.

Figures 2A, 2B, 2C:
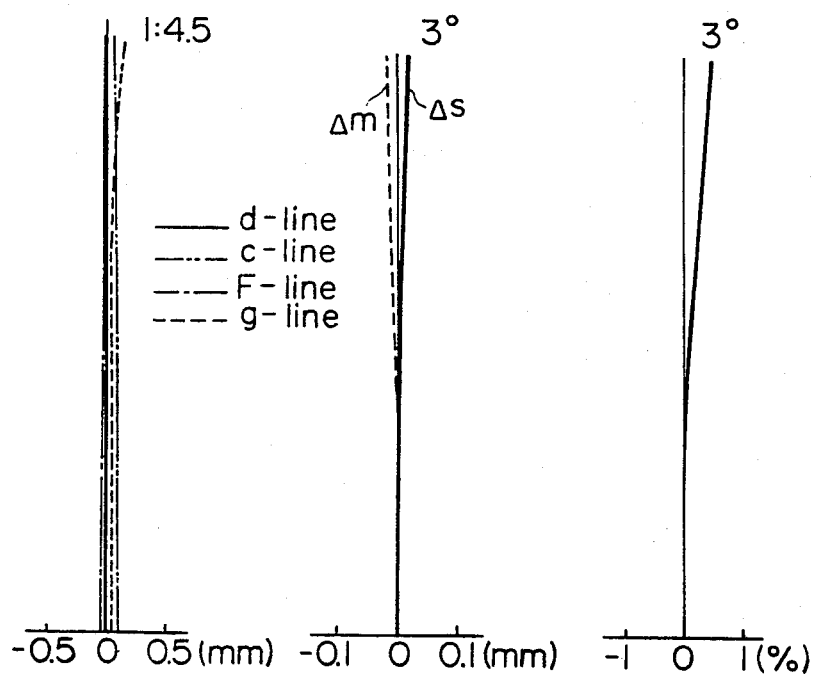

The invention and the advantages thereof will be more clearly understood from the following detailed description when taken in conjunction with the accompanying drawings, wherein:

FIG. 1 is a schematic sectional view of an embodiment of a telescopic lens system according to the invention;

FIGS. 2-A, 2-B and 2-C show a spherical aberration curve, astigmatism curve and distortion curve corrected by one embodiment of the telescopic lens system according to the invention.

FIGS. 3-A, 3-B and 3-C show a spherical aberration curve, astigmatism curve and distortion curve corrected by another embodiment of the telescopic lens system according to the invention.

Referring now to FIG. 1 there is shown a schematic section of a telescopic lens system according to the invention. The telescopic lens system shown in FIG. 1 comprises a front group of lenses and a rear group of lenses separated from the front group of lenses by a large air space $d_7$. The front group of lenses consists of a first biconvex lens whose radii of curvatures, axial thickness and refractive index are denoted by $r_1$, $r_2$, $d_1$ and $n_2$, respectively, a second biconcave lens spaced apart from the first biconvex lens by an air space $d_2$ and having radii of curvatures $r_3$, $r_4$, axial thickness $d_3$ and refractive index $n_2$, a third biconvex lens spaced apart from the second biconcave lens by an air space $d_4$ and having radii of curvatures $r_5$, $r_6$, axial thickness $d_5$ and refractive index $n_3$, and a fourth biconcave lens in contact with the third biconvex lens and having radii of curvatures $r_6$, $r_7$, an axial thickness $d_6$ and refractive index $n_4$.

The rear group of lenses consists of a biconcave lens whose radii of curvatures, axial thickness and refractive index are denoted by $r_8$, $r_9$, $d_8$ and $n_5$, respectively, and a biconvex lens in contact with the biconcave lens and having radii of curvatures $r_9$, $r_{10}$, axial thickness $d_9$ and refractive index $n_6$.

The rear group of lenses shown in FIG. 1 may be replaced by a single lens, but it is preferable to use the lenses shown in FIG. 1 since these lenses make it possible to correct the chromatic aberration in an easy manner.

Now, the invention will be described with reference to numerical examples 1 and 2.

EXAMPLE 1

$f=100$      $f_B=25.05$      $F=1:4.5$      $2\omega=6°$
$r_1= 44.199$      $d_1= 3$ $n_1=1.48749$      $\nu_1=70.2$      $\theta_1=0.521$ $r_2=-79.671$      $d_2= 6.25$
$r_3=-57.444$      $d_3= 1$ $n_2=1.70154$      $\nu_2=41.1$      $\theta_2=0.574$ $r_4=158.31$      $d_4= 0.2$
$r_5= 29.442$      $d_5= 3$ $n_3=1.618$      $\nu_3=63.4$      $\theta_3=0.544$ $r_6=-59.866$      $d_6= 1$ $n_4=1.6134$      $\nu_4=43.8$      $\theta_4=0.560$ $r_7= 80.935$      $d_7=38.5$
$r_8=-14.064$      $d_8= 0.75$ $n_5=1.6779$      $\nu_5=55.3$      $\theta_5=0.543$ $r_9= 44.298$      $d_9= 1.25$ $n_6=1.72342$      $\nu_6=37.9$      $\theta_6=0.582$ $r_{10}=-24.649$ In the above Table 1
$f_B$ . . . Back focus of the whole lens system
$F$ . . . Aperture of the whole lens system
$2\omega$ . . . Angle of sight.

EXAMPLE 2

$f=100$      $f_B=25.07$      $F=1:4.5$      $2\omega=6°$
$r_1= 32.215$      $d_1= 3.5$ $n_1=1.48749$      $\nu_1=70.2$      $\theta_1=0.521$ $r_2=-79.5966$      $d_2= 5.5$
$r_3=-57.7059$      $d_3= 1$ $n_2=1.8061$      $\nu_2=40.8$      $\theta_2=0.569$ $r_4=153.259$      $d_4= 0.2$
$r_5= 28.486$      $d_5= 3$ $n_3=1.618$      $\nu_3=63.4$      $\theta_3=0.544$ $r_6=-54.017$      $d_6= 1$ $n_4=1.6134$      $\nu_4=43.8$      $\theta_4=0.560$ $r_7= 67.34$      $d_7=33.75$
$r_8=-12.922$      $d_8= 0.75$ $n_5=1.713$      $\nu_5=54.0$      $\theta_5=0.540$ $r_9= 42.834$      $d_9= 1.25$ $n_6=1.7495$      $\nu_6=35.2$      $\theta_6=0.586$ $r_{10}=-23.7076$ In FIGS. 2-A and 3-A showing spherical aberration curves corrected by the lens system shown in FIG. 1 and having numerical values given by the above Tables 1 and 2, respectively, the full line curve is the $d$-line, the two dots-dash lines curve the $c$-line, the dot-dash lines curve the F-line and the dotted lines curve the $g$-line.

In FIGS. 2-B and 3-B showing astigmatism curves corrected by the lens system shown in FIG. 1 and having numerical values given by the above Tables 1 and 2, respectively, $\Delta m$ designates the meridional astigmatism curve and $\Delta s$ the sagital astigmatism curve.

FIGS. 2-C and 3-C show distribution curves corrected by the lens system shown in FIG. 1 and having numerical values given by the above Tables 1 and 2, respectively.

As seen from FIGS. 2-A, 2-B, 2-C, 3-A, 3-B and 3-C showing various aberration curves of the two telescopic lens systems embodying the invention, each of these aberrations is significantly corrected. Moreover, the telephoto ratio $K$ can be made at most 0.8.

That is, in the numerical example 1

$$K = (\Sigma d_i + f_B)/f = 0.8,$$

while in the numerical example 2

$$K = (\Sigma d_i + f_B)/f = 0.75.$$

What is claimed is:

1. A telescopic lens system comprising a front group of lenses and a rear group of lenses separated from said front group of lenses by a large air space, said front group of lenses consisting of a first biconvex lens, a second biconcave lens spaced apart from said first biconvex lens, a third biconvex lens spaced apart from said second biconcave lens by a small air space, and a fourth biconcave lens, said third and fourth lenses being substantially in contact, said rear group of lenses consisting of a fifth biconcave lens and a sixth biconcave lens, said fifth and sixth lenses being in contact or spaced apart by a small air space, the whole lens system being constructed such that the following five conditions 1. $f_{234} \leq -f$,
2. $r_3$ is about $-0.57f$,
3. $0.03f \leq d_2 \leq 0.1f$,
4. $|n_3-n_4| \leq 0.03$ and $(\theta_4-\theta_3/\nu_3-\nu_4) \leq 0.0015$, and
5. $n_1 \leq 1.55$ and $\nu_1 \geq 60$ are satisfied, where $f_{234}$ is the composite focal length of the second, third and fourth lenses, $f$ the composite focal length of the whole lens system $r_i$, $d_i$, $n_i$, $\theta_i$ and $\nu_i$ ($i=1, 2, 3. . .$) the radius of curvature of the $i$th lens surface, thickness of the $i$th lens or air space between the $i$th and ($i+1$)th lenses, refractive index, partial dispersion ratio ($ng-nf/nF-nc$) where $ng$ . . . refractive index for $g$-line, $nF$ . . . refractive index for $F$-line and $nc$ . . . refractive index for $c$-line), and Abbe's number of the $i$th lens, respectively.

2. A telescopic lens system as claimed in claim 1, wherein $f=100$ mm, the back focus of the whole lens system $f_B$ is 25.05 mm, the aperture of the whole lens system $F$ is 1:4.5 and the angle of sight $2\omega$ is 6° and $r_1$ to $r_{10}$, $d_1$ to $d_9$, $n_1$ to $n_6$, $\nu_1$ to $\nu_6$ and $\theta_1$ to $\theta_6$ are defined by the following values.

| | | | | |
|---|---|---|---|---|
| $r_1= 44.199$ | $d_1= 3$ | | | |
| | | $n_1=1.48749$ | $\nu_1=70.2$ | $\theta_1=0.521$ |
| $r_2=-79.671$ | $d_2= 6.25$ | | | |
| $r_3=-57.444$ | $d_3= 1$ | | | |
| | | $n_2=1.70154$ | $\nu_2=41.1$ | $\theta_2=0.574$ |
| $r_4=158.31$ | $d_4= 0.2$ | | | |
| $r_5= 29.442$ | $d_5= 3$ | | | |
| | | $n_3=1.618$ | $\nu_3=63.4$ | $\theta_3=0.544$ |
| $r_6=-59.866$ | $d_6= 1$ | | | |
| | | $n_4=1.6134$ | $\nu_4=43.8$ | $\theta_4=0.560$ |
| $r_7= 80.935$ | $d_7=38.5$ | | | |
| $r_8=-14.064$ | $d_8= 0.75$ | | | |
| | | $n_5=1.6779$ | $\nu_5=55.3$ | $\theta_5=0.543$ |
| $r_9= 44.298$ | $d_9= 1.25$ | | | |
| | | $n_6=1.72342$ | $\nu_6=37.9$ | $\theta_6=0.582$ |
| $r_{10}=-24.649$ | | | | |

3. A telescopic lens system as claimed in claim 1, wherein $f=100$mm, the back focus of the whole lens system $f_B$ is 25.07 mm, the aperture of the whole lens system $F$ is 1:4.5 and the angle of sight $2\omega$ is 6° and $r_1$ to $r_{10}$, $d_1$ to $d_9$, $n_1$ to $n_6$, $\nu_1$ to $\nu_6$ and $\theta_1$ to $\theta_6$ are defined by the following values,

| | | | | |
|---|---|---|---|---|
| $r_1= 32.215$ | $d_1= 3.5$ | | | |
| | | $n_1=1.48479$ | $\nu_1=70.2$ | $\theta_1=0.521$ |
| $r_2=-79.5966$ | $d_2= 5.5$ | | | |
| $r_3=-57.7059$ | $d_3= 1$ | | | |
| | | $n_2=1.8061$ | $\nu_2=40.8$ | $\theta_2=0.569$ |
| $r_4=153.259$ | $d_4= 0.2$ | | | |
| $r_5= 28.486$ | $d_5= 3$ | | | |
| | | $n_3=1.618$ | $\nu_3=63.4$ | $\theta_3=0.544$ |
| $r_6=-54.017$ | $d_6= 1$ | | | |
| | | $n_4=1.6134$ | $\nu_4=43.8$ | $\theta_4=0.560$ |
| $r_7= 67.34$ | $d_7=33.75$ | | | |
| $r_8=-12.922$ | $d_8= 0.75$ | | | |
| | | $n_5= 1.713$ | $\nu_5=54.0$ | $\theta_5=0.540$ |
| $r_9= 42.834$ | $d_9= 1.25$ | | | |
| | | $n_6=1.7495$ | $\nu_6=35.2$ | $\theta_6=0.586$ |
| $r_{10}=-23.7076$ | | | | |

* * * * *